United States Patent [19]
Pentikäinen

[11] Patent Number: 5,901,353
[45] Date of Patent: May 4, 1999

[54] UPDATING SUBSCRIBER DATA OF A MOBILE COMMUNICATION SYSTEM

[75] Inventor: Jukka Pentikäinen, Tampere, Finland

[73] Assignee: Nokia Telecommunications OY, Espoo, Finland

[21] Appl. No.: 08/737,862

[22] PCT Filed: Mar. 15, 1996

[86] PCT No.: PCT/FI96/00157

§ 371 Date: Nov. 18, 1996

§ 102(e) Date: Nov. 18, 1996

[87] PCT Pub. No.: WO96/29838

PCT Pub. Date: Sep. 26, 1996

[30] Foreign Application Priority Data

Mar. 17, 1995 [FI] Finland ..................... 951270

[51] Int. Cl.⁶ ............................................. H04Q 7/38
[52] U.S. Cl. ............................................. 455/433; 455/435
[58] Field of Search ..................... 455/418, 422, 455/423, 424, 433, 435, 442, 445, 456, 458

[56] References Cited

U.S. PATENT DOCUMENTS

| | | | |
|---|---|---|---|
| 5,400,390 | 3/1995 | Salin | 455/433 |
| 5,408,683 | 4/1995 | Ablay et al. | 455/433 |
| 5,479,481 | 12/1995 | Koivunen | 455/433 |
| 5,490,201 | 2/1996 | Moberg et al. | 455/433 |
| 5,561,840 | 10/1996 | Alvesalo et al. | 455/456 |
| 5,563,606 | 10/1996 | Wang | 455/13.3 |
| 5,774,802 | 6/1998 | Tell et al. | 455/456 |

FOREIGN PATENT DOCUMENTS

| | | |
|---|---|---|
| 702 497 | 3/1996 | European Pat. Off. . |
| 93/25051 | 12/1993 | WIPO . |
| 94/04006 | 2/1994 | WIPO . |
| 94/23506 | 10/1994 | WIPO . |

Primary Examiner—Willis R. Wolfe
Assistant Examiner—Hieu T. Vo
Attorney, Agent, or Firm—Pillsbury Madison & Sutro LLP

[57] ABSTRACT

A method for obtaining subscriber data in a mobile communication system includes a home data base and a visitor data base. The home data base stores data about subscribers to the home data base and an age label noting the previous updating of the data of each subscriber. The home data base data is updated in response to update requests of subscriber data. The visitor data base stores data about subscribers registered in the visitor data base and in each label indicating the previous updating of the data of each subscriber. The visitor data base data is updated in response to updating requests of subscriber data. There is a method for recovering the data of visiting subscribers between mobile communication systems and/or between nodes of the mobile communication network.

28 Claims, 1 Drawing Sheet

UPDATING SUBSCRIBER DATA OF A MOBILE COMMUNICATION SYSTEM

This application is the national phase of international application PCT/FI96/00157, filed Mar. 15, 1996 which designated the U.S.

FIELD OF THE INVENTION

The invention relates to a method for updating subscriber data in a mobile communication system comprising a home database into which the subscriber data of subscribers of said home database and an age label informing of the previous updating of the data of each subscriber are stored, and the data of which home database is updated in response to updating requests of subscriber data, and a visitor database into which the data of subscribers registered to said visitor database and an age label informing of the previous updating of the data of each subscriber are stored, and the data of which visitor database is updated in response to updating requests of subscriber data.

The invention shows a method for recovering the data of visiting subscribers between mobile communication systems and/or between nodes of the mobile communication network.

BACKGROUND OF THE INVENTION

Today there are various cellular radio or mobile telephone systems in use and being planned in which the geographical area covered by the system is divided into smaller separate radio areas, that is, cells in such a manner that a radio telephone or a mobile telephone in a cell communicates with a fixed network via a fixed radio station placed in the cell. The mobile telephones in the system can move freely in the area of the system from one cell to another. One such system is the digital mobile telephone system GSM (Global System for Mobiles).

In connection with cellular radio networks, it is known that a home location register stores the location information and subscriber data of the radio telephones registered to the network constantly into a memory means, such as RAM, from which the data will volatilize for example when the power supply of the home database is cut off, and at regular intervals into a non-volatile memory means, for example, into a hard disk on which the data is retained permanently. When the home database occasionally has to restart itself, the location information and subscriber data stored into the volatile memory will disappear. Then the home database has to request all the visitor databases of the mobile communication system, such as visitor databases of the radio telephone network, to perform the location updating of the subscribers registered to this home database in order that the home database would be able to update the location information of its subscribers. The home database needs the location information of the subscribers so that it is able to submit the correct location of the subscriber to the mobile services switching center intending to transmit a call to this subscriber.

Some prior art solutions are disclosed in GSM Specification "prETS 300 599, (GSM 09.02 version 4.9.0), November. 1994, European digital cellular telecommunications system (Phase 2); Mobile Application Part (MAP) specification, ETSI, p. 317 to 468."

According to the specification above, the recovery is performed after restarting the home location register (HLR) or the visitor location register (VLR).

The restart of the home location register HLR takes place in such a manner that the subscriber data of the home location register HLR in the visitor location register VLR is set to a state in which the visitor location register VLR transmits a registration request to the home location register HLR only when a certain impulse relating to the subscriber is received. This impulse can be a subscriber registration, an incoming call to a subscriber or a subscriber's call attempt. The information in the visitor location register/visitor database is the location information of the subscriber and data on the services permitted to and activated for the subscriber.

The restart of the visitor location register/database VLR takes place in such a manner that the data of the subscribers registered to the visitor location register is deleted from the visitor location register, whereby the visitor location register VLR sends a registration request to the home location register HLR when it detects a certain impulse relating to the subscriber, for example, a subscriber registration or an incoming call to the subscriber.

Above and in the following, home location register is considered to be similar to home database and visitor location register is considered to be similar to visitor database. Both are databases into which are stored the location of the subscriber with a certain accuracy and the subscriber data.

A problem of prior art solutions is that they do not ensure the accessibility of the subscribers in all situations even though the subscriber has a valid registration at some visitor database VLR.

The first example of a problem situation of the prior art is a situation in which the home database HLR loses data on which home database VLR the subscriber is registered to at the moment of observation. This fault situation may be caused by the home database getting suddenly damaged, for example. In that case the subscriber cannot be reached via the home database HLR before the subscriber has next time a radio contact with the system, whereby the registration data of the subscriber will be updated to the home database.

The second example of a problem situation of the prior art is a situation in which the deletion of registration from the previous visitor database VLR has not been successful in connection with handover/roaming/handoff, that is, in a situation in which the subscriber has moved from the service area of the original visitor database to a service area of a new visitor database. In a situation like this the deletion of the subscriber from the first visitor database is to be done so that the home database sends a deletion message to the visitor database with which the registration of said subscriber to the visitor database is to be deleted. If this deletion operation is not successful, or if the data recovery method is not capable of amending the situation, a difficult situation will arise. Then calls made from the area of the visitor database to the subscriber, for example, will fail as the visitor database pages said subscriber in its own service area although in actual fact, said subscriber is already registered to some other visitor database. The paging visitor database is not aware of the situation, and attempts to page the subscriber in its own service area and establish a call to a subscriber that is in actual fact not in the service area of the visitor database.

The third disadvantage of the prior art solutions is caused by that since at the restart of the visitor database VLR the data of the visitors is deleted from the active memory of the database, in order to operate well the method requires subscriber search or paging by broadcasting paging messages over the radio path to all subscribers. Subscriber paging through the radio path loads the radio path considerably between the base station and mobile station of the mobile communication system and thus consumes radio path capacity. Subscriber paging is used for example in connection with call establishment for finding a B subscriber in the area of the visitor database VLR when the data of said B subscriber e.g. the location information of the subscriber is not found in the visitor location register indicated by the home database. The problem is caused by that the visitor database has for some reason lost the data of the mobile station but this data is still in the home database of said subscriber. Then the home database knows the location of the subscriber only at the accuracy of the visitor database VLR, but not at the accuracy of the location area (LA), whereby the visitor database has to page said subscriber from its own service area by means of messages sent on the radio path. They naturally load the radio path unnecessarily.

The fourth disadvantage of the prior art solutions is caused by that recovery operates in them triggered by subscriber units. Then the loading caused by recovery in the nodes and between the nodes is uncontrolled because the subscribers start the recovery by their own activity, e.g. when registering into the network or when sending messages. Therefore the start of recovery may be periodical and bound to the time of the day and the day of the week, whereby the recovery of the data of several subscribers may start relatively at the same time, for example, when several subscribers register to the network at the beginning of a working day. This kind of recovery, started by the movements or the activity of the subscribers, causes uncontrolled loading to the system and because of the inconvenience it causes to subscribers, it is not very suitable to be used periodically without a detected fatal fault situation.

In one solution of the prior art, recovery delay is shortened by forcing the subscribers to register to the mobile communication system and its databases as often as possible even if the radio subscriber does not change the base station. A drawback of this procedure is that it loads the radio path because then the subscribers will send registration messages of their own at desired intervals on the radio path to base stations from which they are forwarded to exchanges and databases.

DESCRIPTION OF THE INVENTION

The object of the present invention is to enable location information and other data of visiting subscribers to be recovered between mobile telephone networks or between nodes of a mobile telephone network at desired points of time or after certain fault situations, for example.

The object of the invention is also to solve the problems of the prior art solutions.

This new method for updating subscriber data in a mobile communication system is achieved with the method according to the invention that is characterized in that the method comprises the following steps: the visitor database receives information on that the data of subscribers registered thereto should be recovered although the visitor database has not received a normal subscriber data updating request of the mobile communication system, the visitor database searches from its database the data and the age label of each subscriber registered to the visitor database and sends a virtual registration request concerning the subscriber of the home database of the subscriber, the request being provided with the age label of the subscriber in said visitor database, in response to the virtual registration request, the home database compares the subscriber data in its own database and its previous age label with the corresponding data in the virtual registration request and the age label therein, on the basis of this comparison, the home database deduces if the subscriber data should be updated in the home database or in the visitor database, as a result of this deduction, the home database commands the desired databases to update the subscriber data and the age label.

The invention also relates to a mobile communication system comprising: a home database into which the subscriber data of the home database and the age label of the data of each subscriber are stored, and the data of which home database is updated in response to the updating requests of subscriber data, a visitor database into which the data of the subscribers registered to the visitor database and the age label of the data of each subscriber are stored, and the data of which visitor database is updated in response to the updating requests of subscriber data.

The mobile communication system of the invention is characterized in that the visitor database comprises means for searching the data of each subscriber registered to the visitor database and the age label of said subscriber and for sending them to the database of said subscriber in a virtual registration request concerning said subscriber, the request being provided with the age label of the subscriber data in the visitor database, the home database comprises: means responsive to the virtual registration request for comparing the subscriber data in its own database and its age label with the corresponding data in the virtual registration request and the age label therein, and for deducing on the basis of this comparison if said subscriber data is to be updated in the home database or in the visitor database, and means for commanding, as a result of this deduction, the desired databases to update the subscriber data and the age label.

The invention further relates to a visitor database of the mobile communication system into which the data of the subscribers registered to the visitor database and the age label of the data of each subscriber are stored, and the data of which visitor database is updated in response to the updating requests of subscriber data.

The visitor database of the invention is characterized in that it comprises: means for sending a virtual registration request to the home database of the subscriber registered to the visitor database, in response to which virtual registration request the home database compares the subscriber data in its own database and its age label with the corresponding data in the virtual registration request and the age label therein, whereby on the basis of this comparison, the home database deduces if the subscriber data should be updated in the home database or in the visitor database, and as a result of this deduction, the home database commands the desired databases to update the subscriber data and the age label.

The invention further relates to a home database of the mobile communication system into which the subscriber data of the home database and the age label informing of the previous updating of the data of each subscriber are stored, and which data is updated in response to the updating requests of subscriber data.

The home database of the invention is characterized in that it comprises: means responsive to the virtual registration request sent by the visitor database for comparing the subscriber data in its own database and its previous age label with the corresponding data in the virtual registration request and the age label therein, and for deducing on the basis of this comparison if the subscriber data should be updated in the home database or in the visitor database, and for commanding, as a result of this deduction, the required databases to update the subscriber data and the age label.

The invention is based on the idea that the recovery of subscriber data and location information of the subscribers can be accomplished in such a manner that a virtual registration request similar to a normal registration request generated by the system for each visiting subscriber is sent from the visitor network or the visitor node to the home network or the home node, whereby the location information and other data concerning the subscriber are updated in all databases in accordance with the normal registration sequence.

The advantage of this method for updating subscriber data according to the invention is that it solves the problems of the prior art solutions.

The problem shown in the first example of the prior art solutions is solved in such a manner that if the subscriber has a valid registration in some visitor database even if the home database does not have the subscriber data or the location information of the subscriber, the required data is transmitted to the other required databases in accordance with the invention as fast as the system is able to without becoming overloaded and older incorrect registrations are deleted from the databases.

The method according to the invention also solves the problem shown in the second example of the prior art solutions in such a manner that subscriber data is recovered actively into the home database of the subscriber and further to all visitor databases from which the old and incorrect location information/subscriber data is deleted, when needed.

The method according to the invention further solves the problem shown in the third example of the prior art solutions in such a manner that no data in the databases is destroyed if there is no relatively more correct data to replace it.

The method according to the invention also solves the problem shown in the fourth example of the prior art solutions in such a manner that by synchronizing the transmission of the new registration data to the acknowledgement received from the previous one, the loading caused by recovery can be adjusted in accordance with the total load.

A further advantage of the invention is that it does not at all load the radio path.

BRIEF DESCRIPTION OF THE FIGURES

In the following, the invention will be explained in more detail with reference to the accompanying drawing, in which.

DETAILED DESCRIPTION OF THE INVENTION

Start of Recovery

Figure 1:
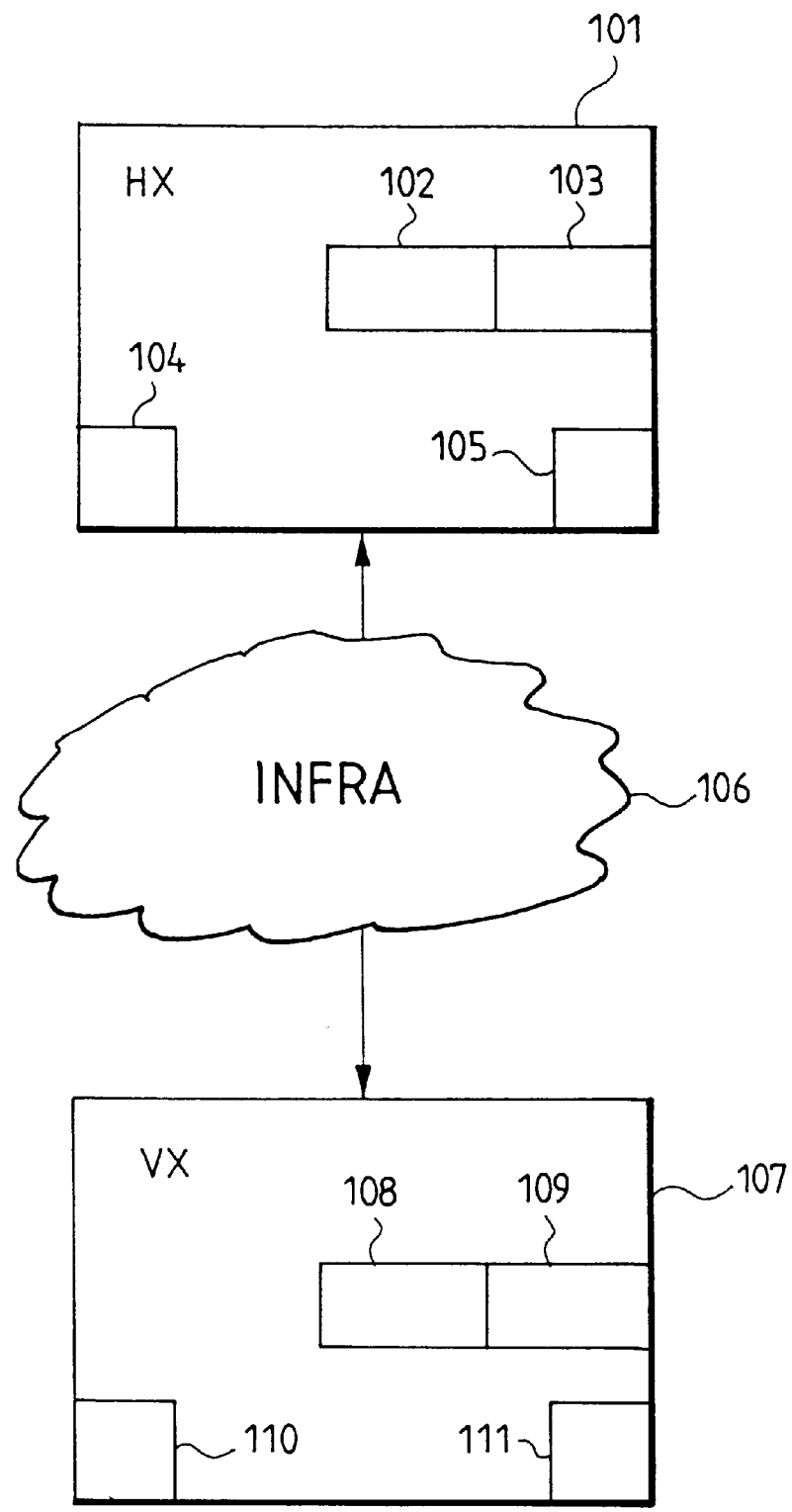
FIG. 1 illustrates a block diagram of the mobile communication system according to the invention with home and visitor databases.

Recovery of the data of visiting subscribers can be started either on the initiative of the home database, which is the home location register, home network or home node of the subscriber, or visitor database, which is the visitor location register, visitor network or visitor node of the subscriber. Recovery can be started for example periodically, by user command or because of a detected or suspected fault situation. Recovery can be directed to one or several visitor databases or one or several home databases, whereby the subscriber data is updated from all desired databases.

If recovery is started on the initiative of the home database, it sends a recovery start request message to all the visitor databases with which the recovery is to be done. When visitor databases receive a start request message, they start recovering the data of the subscribers, that is, of the visitors having requested recovery in their database.

If the recovery is started on the initiative of the visitor database, it starts recovering the data of the subscribers, that is, of the visitors with which the recovery is to be done.

Recovery

Recovery is performed by sending a virtual registration request similar to a normal registration request generated by the system for each visiting subscriber from the visitor network or the visitor node to the home network or the home node, whereby location information and other data concerning the subscriber are updated in all databases in accordance with the normal registration sequence. In the method, the processing sequence of registrations operating between the databases processes non-real time registration events, for example so that it compares the age labels of registrations with one another and selects the one with the most recent registration to be the valid registration.

Terminating Recovery

Recovery is terminated when the visitor database detects it has recovered the data of all the desired visitors.

When needed, registration requests used in recovery can be sent one at a time so that the visitor database, visitor location register, visitor network or node sends a new virtual registration request only when a previous virtual registration request has already been processed both in the home and visitor network or node. Then the home and visitor location registers of the mobile communication system will not be too loaded so that the overloading of home location registers is prevented.

When needed, the method according to the invention can be supplemented so that also the home network or node sends data on the visiting subscribers of its own to the visitor network or node.

The visitor database can also notify the home database of the start of recovery if the recovery is started on the initiative of the visitor database. The data can be used for informing the operator of the mobile communication system in the operation and maintenance center, for example.

Further, the visitor database can inform the home database of the termination of recovery. The data can be used for informing the operator of the mobile communication system in the operation and maintenance center, for example.

In one embodiment of the invention, virtual registration requests can be sent one at a time so that the visitor database sends a new virtual registration request only after the previous virtual registration request has been processed both in home and visitor database. In that case in accordance with the invention, the visitor database starts processing a new virtual registration request after it has received an acknowledgement, that is, for example, subscriber data as a result of the previous virtual registration request from the home database. The visitor database can, when required, process side by side the received acknowledgement and the new virtual registration. When operating in accordance with this procedure, the speed of recovery and the loading caused by recovery will be adjusted automatically according to the load rate of both visitor and home databases as in that case the invention will operate in such a manner that the greater the loading of the databases, the slower the virtual registrations are performed in the home database and the slower the acknowledgements achieved by them are sent to visitor databases that therefore also send new virtual registration requests only at this slow rate.

The synchronization of the sending of the virtual registrations to the acknowledgements incoming from the home database is a good method of implementation because by means of it, the speed of recovery and the load caused by recovery can be adjusted automatically according to the load rate of both visitor and home database. This method is also easy to implement.

The method according to the invention can be supplemented by prioritizations between virtual registrations and other events. Then e.g. the normal registrations of the mobile communication system are prioritized so that they are always performed before virtual registrations.

Alternatively, the speed of the performance of virtual registrations and loading caused by it to the mobile communication network can be adjusted by pausing between sending virtual registrations, for example.

The method of the invention can be supplemented by a cross referencing procedure so that data is also sent from the home database to the visitor database on subscribers that according to the home database are registered to the visitor database. Then the possible data on the registration of the subscriber to a certain visitor database can be deleted from the home database when the subscriber does not have a valid registration at that or any database.

According to another embodiment of the invention, home database can, when needed, keep an account of the subscribers whose data has already been recovered by means of a virtual registration request sent by the visitor database.

FIGURE shows a block diagram of the mobile communication system according to the invention with home and visitor databases. A home location register HX of the mobile communication system is connected by means of telecommunication connections 106 to a visitor location register VX of the mobile communication system. The telecommunication connections 106 can be a telecommunications infrastructure INFRA. FIGURE shows a visitor database VX 107 of the mobile communication system. Data 108 of the subscribers registered to the visitor database and also an age label 109 of the data of each subscriber are stored into the visitor database VX. It is also possible that subscriber data is updated separately, whereby each data to be updated can be given an age label of its own. The data of the visitor database is updated in response to updating requests of subscriber data. The visitor database according to the invention comprises means 110 for searching the data of each subscriber registered to the visitor database and the age label of the subscriber and for sending them to the home database of the subscriber in a virtual registration request concerning the subscriber. This request is provided with an age label of the subscriber data in the visitor database.

The visitor database VX, 107 according to the invention further comprises means 111 responsive to deletion messages sent by the home database for comparing the subscriber data 108 in its own database and their age label 109 with the corresponding data in the deletion message and the age label therein, and for deducing on the basis of the comparison if the subscriber data is to be deleted in the visitor database VX, 107.

The FIGURE also shows a home database HX 101 into which data 102 of the subscribers of the home database and an age label 103 of each subscriber are stored. The data of the home database is updated in response to the updating requests of subscriber data. The home database comprises means 104 responsive to the virtual registration request for comparing the data 102 of the subscriber in its own database and its age label 103 with the corresponding data in the virtual registration request and the age label therein, and for deducing on the basis of the comparison if the subscriber data is to be updated in the home database or in the visitor database. The home database further comprises means 105 that on the basis of the deduction command the required databases to update subscriber data and age label.

It is also possible that the home location register acknowledges the virtual registration request to the visitor location register that sent it by sending an acknowledgement message containing the subscriber data to be updated, for example, the subscriber's call and service rights definitions. In response to the acknowledgement, the visitor location register compares the age label/labels included in the acknowledgement with the age label/labels in its own database and selects the most recent data for its own database.

The drawings and the specification related thereto are only intended to illustrate the idea of the invention. In its details, the method, the mobile communication system and the various databases according to the invention may vary within the scope of the claims. Even though the invention is above explained mainly in connection with the mobile communication system, the invention may be applied to other kinds of radio telephone systems.

I claim:

1. A method for updating subscriber data in a mobile communication system comprising a home database (HX, 101) into which the subscriber data (102) of subscribers of said home database and an age label (103) informing of the previous updating of the data of each subscriber are stored, and the data of which home database is updated in response to updating requests of subscriber data, and a visitor database (VX, 107) into which the data (108) of subscribers registered to said visitor database and an age label (109) informing of the previous updating of the data of each subscriber are stored, and the data of which visitor database is updated in response to updating requests of subscriber data, characterizedby the method comprising the steps of:

the visitor database (VX, 107) receiving information on that the data (108) of subscribers registered thereto should be recovered although the visitor database has not received a normal subscriber data updating request of the mobile communication system, the visitor database (VX, 107) searching from its database the data (108) and the age label (109) of each subscriber registered to the visitor database and the visitor database (VX, 107) sending a virtual registration request concerning said subscriber to the home database (HX, 101) of the subscriber, the request being provided with the age label (109) of the subscriber in said visitor database, in response to the virtual registration request, the home database (HX, 101) comparing the subscriber data (102) in its own database and its previous age label (103) with the corresponding data in the virtual registration request and the age label (109) therein, the home database (HX, 101) deducing on the basis of this comparison if the subscriber data (102; 108) should be updated in the home database or in the visitor database (VX, 107), the home database (HX, 101) commanding, as a result of this deduction, the desired databases (VX, 107) to update the subscriber data (108) and the age label (109).

2. A method according to claim 1, characterized in that if it is found out in the comparison that the same subscriber data (102; 108) and the same age labels (103; 109) are both in the home database (HX, 101) and in the visitor database (VX, 107), the home database sends an acknowledgement to the visitor database (VX, 107) that sent the virtual registration request.

3. A method according to claim 1, characterized in that if it is found out in the comparison that the location information (102) of the subscriber included in the home database is correct, but that the age label (103) of that data is older than the age label (109) in the virtual registration request, the home database (HX, 101) updates the age label (109) included in the virtual registration request into its own database and sends an acknowledgement to the visitor database (VX, 107) that sent the virtual registration request.

4. A method according to claim 1, characterized in that if it is found out in the comparison that the location information (102) included in the home database (HX, 101) is different from the location information (108) of the subscriber in the virtual registration request, and that the age label (103) of that data in the home database (HX, 101) is older than the age label (109) in the virtual registration request, and if there is data in the home database (HX, 101) that said subscriber is registered to the home database although the subscriber is in actual fact registered to the visitor database (VX, 107), the home database updates for itself the data on the registration of the subscriber to the visitor database and the age label (109) of this registration and sends an age label in an acknowledgement message to the visitor database that sent the virtual registration request.

5. A method according to claim 1, characterized in that if it is found out in the comparison that the location information of the subscriber included in the home database (HX, 101) is different from the location information (108) in the virtual registration request, and that the age label (103) of that data in the home database is older than the age label (109) in the virtual registration request, and if there is data in the home database (HX, 101) that the subscriber is registered into another visitor database although the subscriber is in actual fact registered to the visitor database (VX, 107) that sent the virtual registration request, the home database (HX, 101) updates for itself the data on that visitor database that sent the virtual registration request and the age label (109) therein, sends a deletion message to the other visitor database and sends an acknowledgement to the visitor database (VX, 107) that has sent the virtual registration request.

6. A method according to claim 1, characterized in that if it is found out in the comparison that the location information (102) of the subscriber included in the home database (HX, 101) is provided with a more recent age label (103) than the location information (108) of the subscriber in the virtual registration request, the home database sends a deletion message to the visitor database (VX, 107) that sent the virtual registration request, in response to which deletion message the visitor database deletes from its database said subscriber data (108) and sends an acknowledgement message of the deletion message to the home database (HX, 101).

7. A method according to claim 1, characterized in that if the home database (HX, 101) updates the identifier of a new visitor database (VX, 107) into its own database, the home database sends a deletion message concerning the subscriber data (108) to the old visitor database to which the subscriber has previously been registered according to the data (102) of the home database (HX, 101), and an acknowledgement to said new visitor database.

8. A method according to claim 7, characterized in that the deletion message received in the visitor database (VX, 107) has an age label of the subscriber data that the visitor database (VX, 107) that received the deletion message compares with the age label (109) concerning said subscriber in its own database, whereby as a result of this comparison, if the age label (103) in the home database (HX, 101) of each subscriber is more recent than or as old as the age label (109) relating to said subscriber in the database of the visitor database (VX, 107), the visitor database deletes said subscriber data from its own database, and if the age label (103) in the home database (HX, 101) of each subscriber is older than the age label (109) relating to said subscriber in the database of the visitor database (VX, 107), the visitor database sends a virtual registration request to the home database of said subscriber.

9. A method according to claim 1, 7 or 8, characterizedin that information on that the data (108) of the subscribers registered thereto should be recovered is received by the visitor database (VX, 107) from the home database (HX, 101) that sends a recovery request message to the visitor database.

10. A method according to claim 9, characterized in that the recovery request message is sent if the home database (HX, 101) has detected a fault situation in the mobile communication network.

11. A method according to claim 9 or 10, characterizedin that the recovery request message is sent if the home database (HX, 101) suspects there is a fault situation in the mobile communication network.

12. A method according to claim 9, 10 or 11, characterizedin that the home database (HX, 101) sends a recovery request message to all the visitor databases (VX, 107) that the home database wants to perform the recovery.

13. A method according to claim 9, 10, 11 or 12, characterizedin that the recovery request is sent in response to a manual command provided by the user.

14. A method according to claim 1, 7 or 8, characterizedin that the visitor database (VX, 107) decides that the data (108) of the subscribers registered thereto should be recovered.

15. A method according to claim 14, characterized in that the visitor database (VX, 107) decides to recover the data (108) of the subscribers registered thereto if the visitor database detects a fault situation in the mobile communication system.

16. A method according to claim 14 or 15, characterizedin that the visitor database (VX, 107) decides to recover the data (108) of the subscribers registered thereto if the visitor database suspects there is a fault situation in the mobile communication system.

17. A method according to claim 1, 2, 3, 4, 5, 6 or 8, characterizedin that the virtual registration request is sent from the visitor database in response to a command provided by the user.

18. A method according to claim 1 or 8, characterizedin that the virtual registration requests are sent to several home databases (HX, 101).

19. A method according to claim 1, 8 or 18, characterizedin that the virtual registration requests are sent to the desired home databases (HX, 101) in such a manner that only the subscriber data (102) of the desired home databases is recovered.

20. A method according to claim 1, 8, 18 or 19, characterizedin that the virtual registration request is sent only when the acknowledgement of the previous virtual registration request sent by the home database has arrived in the visitor database (VX, 107).

21. A method according to claim 1, 13, 16, 19 or 20, characterizedin that the virtual registration requests are provided with priorities in response to which the recovery procedures caused by various virtual registration requests are performed in the order indicated by the priorities.

22. A method according to claim 21, characterized in that the virtual registration requests are provided with priorities which prioritize the desired procedures of the mobile communication system classified as being important over the virtual registration requests, and the desired procedures classified as being less important to be performed after the virtual registration requests.

23. A method according to claim 1, characterized in that the data is sent as a comparison message from the home database (HX, 101) to the visitor database (VX, 107) on the subscribers that have according to the home database (HX, 101) their data in the visitor database.

24. A method according to claim 23, characterized in that in response to the comparison message, the visitor database (VX, 107) makes a comparison as a result of which, if it is found out in the comparison that a subscriber is not registered to the visitor database, the visitor database will inform the home database (HX, 101) that the subscriber is not registered to the visitor database, whereby the home database deletes from its own database the data (102) on the registration of said subscriber to the visitor database (VX, 107).

25. A mobile communication system comprising:

a home database (HX, 101) into which subscriber data (102) of the home database and an age label (103) of the data of each subscriber are stored, and the data of which home database is updated in response to the updating requests of subscriber data, a visitor database (VX, 107) into which data (108) of the subscribers registered to the visitor database and an age label (109) of the data (108) of each subscriber are stored, and the data of which visitor database is updated in response to the updating requests of subscriber data, the system being c h a r a c t e r i z e d in that the visitor database (VX, 107) comprises means (110) for searching the data (108) of each subscriber registered to the visitor database and the age label (109) of said subscriber and for sending them to the home database (HX, 101) of said subscriber in a virtual registration request concerning said subscriber, the request being provided with the age label (109) of subscriber data (108) in the visitor database (VX, 107), and that the home database (HX, 101) comprises:

means (104) responsive to the virtual registration request for comparing the subscriber data (102) in its own database and its age label (103) with the corresponding data in the virtual registration request and the age label therein, and for deducing on the basis of this comparison if the subscriber data is to be updated in the home database (HX, 101) or in the visitor database (VX, 107), and means (105) for commanding, as a result of this deduction, the required databases to update the subscriber data (108) and the age label (109).

26. A mobile communication system according to claim 25, characterizedin that the visitor database (VX, 107) comprises:

means (111) responsive to the deletion messages sent by the home database for comparing the subscriber data (108) in its own database and its age label (109) with the corresponding data in the deletion message and the age label therein, and for deducing on the basis of the comparison if the subscriber data is to be deleted in the visitor database (VX, 107).

27. A visitor database (VX, 107) of the mobile communication system into which data (108) of the subscribers registered to the visitor database and an age label (109) of the data of each subscriber are stored, and the data of which visitor database is updated in response to the updating requests of subscriber data, the visitor database being characterized in that it comprises:

means (110) for sending a virtual registration request to a home database (HX, 101) of the subscriber registered to the visitor database (VX, 107), in response to which virtual registration request the home database compares subscriber data (102) in its own database and its age label (103) with the corresponding data in the virtual registration request and the age label therein, whereby on the basis of this comparison, the home database deduces if the subscriber data should be updated in the home database or in the visitor database, and as a result of this deduction, the home database commands the desired databases to update the subscriber data and the age label.

28. A home database (HX, 101) of the mobile communication system into which subscriber data (102) of the home database and an age label (103) informing of the previous updating of the data of each subscriber are stored, and the data of which home database is updated in response to the updating requests of subscriber data, characterizedin that the home database (HX, 101) comprises:

means (104) responsive to the virtual registration request sent by a visitor database (VX, 107) for comparing the subscriber data (102) in its own database and its age label (103) with the corresponding data in the virtual registration request and the age label therein, and for deducing on the basis of this comparison if the subscriber data is to be updated in the home database (HX, 101) or in the visitor database (VX, 107), and for commanding, as a result of this deduction, the desired databases to update the subscriber data and the age label.

\* \* \* \* \*